US008200355B2

(12) United States Patent
Lee et al.

(10) Patent No.: US 8,200,355 B2
(45) Date of Patent: Jun. 12, 2012

(54) METHOD FOR MANUFACTURING ARTIFICIAL IMPLANTS

(75) Inventors: Shih Tseng Lee, Taipei (TW); Yu-Te Wu, Taipei (TW); Yuan-Lin Liao, Taichung (TW); Chia-Feng Lu, Taipei (TW); Jiann-Der Lee, Taoyuan (TW)

(73) Assignee: Chang Gung University, Taoyuan County (TW)

( * ) Notice: Subject to any disclaimer, the term of this patent is extended or adjusted under 35 U.S.C. 154(b) by 405 days.

(21) Appl. No.: 12/645,890

(22) Filed: Dec. 23, 2009

(65) Prior Publication Data

US 2011/0054656 A1 Mar. 3, 2011

(30) Foreign Application Priority Data

Sep. 1, 2009 (TW) ................................ 98129466 A

(51) Int. Cl.
*G06F 19/00* (2011.01)

(52) U.S. Cl. ..... 700/118; 700/98; 623/11.11; 623/16.11

(58) Field of Classification Search ................... 700/97, 700/98, 118; 623/11.11, 16.11, 901; 345/419
See application file for complete search history.

(56) References Cited

U.S. PATENT DOCUMENTS 5,741,215 A * 4/1998 D'Urso ......................... 600/407
6,254,639 B1 * 7/2001 Peckitt ........................ 623/11.11
6,932,842 B1 * 8/2005 Litschko et al. ............ 623/16.11
2010/0069455 A1 * 3/2010 Takato et al. ................. 514/406

OTHER PUBLICATIONS

Yuan-Lin Liao, et al,Abstract of Oral Presentation, 5th Asian Conference on Computer Aided Surgery, Jul. 3-4, 2009, Chang Bin, Taiwan.

* cited by examiner

*Primary Examiner* — Albert Decady
*Assistant Examiner* — Douglas Lee
(74) *Attorney, Agent, or Firm* — WPAT, P.C.; Anthony King

(57) ABSTRACT

The present invention relates to a method for manufacturing artificial implants, comprising 1) acquiring the pre-operation three dimensional volume image and the post-operation three dimensional volume image of the operation portion, thereby respectively producing the pre-operation target image and the post-operation target image including the target; 2) aligning the pre-operation target image with the post-operation target image so as to generate the aligned image; 3) acquiring the difference image of the incised part in the target based on the aligned image; 4) building the three dimensional model of mold points of the incised part based on the difference image; and 5) manufacturing the artificial implant having the same shape with the incised part based on such three dimensional model of mold points.

22 Claims, 25 Drawing Sheets

METHOD FOR MANUFACTURING ARTIFICIAL IMPLANTS

BACKGROUND OF THE INVENTION

1. Field of the Invention

The present invention relates to a method for manufacturing artificial implants; in particular, the present invention relates to a method for building a three dimensional model of mold points based on the pre-operation and post-operation images and manufacturing artificial implants in accordance with such three dimensional model of mold points.

2. Description of Related Art

At present, in the field of clinical neurosurgery, under the circumstances of hyper intracranial pressure in patient's brain caused by intracranial tumor, hydrocephalus or other factors, it is common to perform the craniotomy to facilitate effective reduction of the intracranial pressure, and the cranial incisions induced by the craniotomy can be recovered by means of the cranial reconstruction operation. Based on the premises of minimum post-operation infection and desirable restoration of the patient's previous cranial shape, the rebuilt incised skull part should match the operation incision as mush as possible and the profile of the cranium (in terms of both arc feature and size) should also fit into the original cranial shape.

A prior art cranium recovery method involves, in case of single-sided craniotomy, by using the mirroring principal, reconstruction of the incised cranium on the incision side according to the shape of intact cranial on the opposite side. However, such a mirroring cranium reconstruction method inevitably encounters three major issues:

(1) the cranium may not be perfectly symmetric in horizontal orientation, thus the aforementioned mirroring reconstruction approach is probably not able to completely restore the original head shape before surgery, causing variation and unfamiliarity in patient's appearance;

(2) by using the mirroring method, it is incapable of resulting in effective match between the cranium and operation incisions, even through manual adjustment may be performed by professional technicians;

(3) due to limits implicitly caused by mirroring samplings, the aforementioned method can be only applicable to single-sided craniotomy, and such a method can not provide effective reconstruction results for patients receiving dual-sided craniotomy.

Or, alternatively, a patient may be in need of surgical excision operations for removing a certain part of body (e.g., nasal cartilaginous tissue or breast), accordingly forming an incised part and causing unwanted changes in appearance. Hence it is required to reconstruct an artificial implant on the incised part by means of plastic surgery so as to restore patient's appearance. However, since the profile of such an artificial implant may not be produced in accordance with the original aspects of the incised part, the patient's appearance will be altered, and problems such as ineffective match of the artificial implant, varied post-operation body shape and the like may still exist.

SUMMARY OF THE INVENTION

With regards to the aforementioned problems, the object of the present invention is to provide a method for manufacturing artificial implants in order to address to issues found in prior art, such as appearance changes caused by mirroring artificial bone reconstruction, ineffective match of artificial implant and incapability of applying artificial bone reconstruction onto patients receiving the dual-sided craniotomy.

According to one objective of the present invention, a method for manufacturing artificial implants is provided, comprising acquiring the pre-operation three dimensional volume image of the operation portion and accordingly producing the pre-operation target image including the target; acquiring the post-operation three dimensional volume image of the operation portion and accordingly producing the post-operation target image including the target, in which the post-operation target image includes the target having at least one incised part, compared with the pre-operation target image; aligning the pre-operation target image with the post-operation target image, thereby generating the aligned image; acquiring the difference image of the incised part in the target based on the aligned image; building the three dimensional model of mold points of the incised part based on the difference image; and manufacturing the artificial implant having substantially the same shape as the incised part based on the three dimensional model of mold points.

As described in the previous texts, the method for manufacturing artificial implants according to the present invention may provide the following advantages:

(1) when the artificial implant created in accordance with the method of the present invention is implanted into the incised part of the patient through surgical operations, the post-operation appearance and shape at the incised part of the patient presents high similarity to the original appearance and shape before operation;

(2) the profile of the artificial implant created in accordance with the method of the present invention highly resembles the incised part, such that desirable match between the artificial implant and the surgical incisions can be successfully achieved;

(3) the artificial implant created in accordance with the method of the present invention is applicable to the patient receiving the dual-sided craniotomy or having multiple incised parts.

DETAILED DESCRIPTION OF THE PREFERRED EMBODIMENTS

Figure 1:
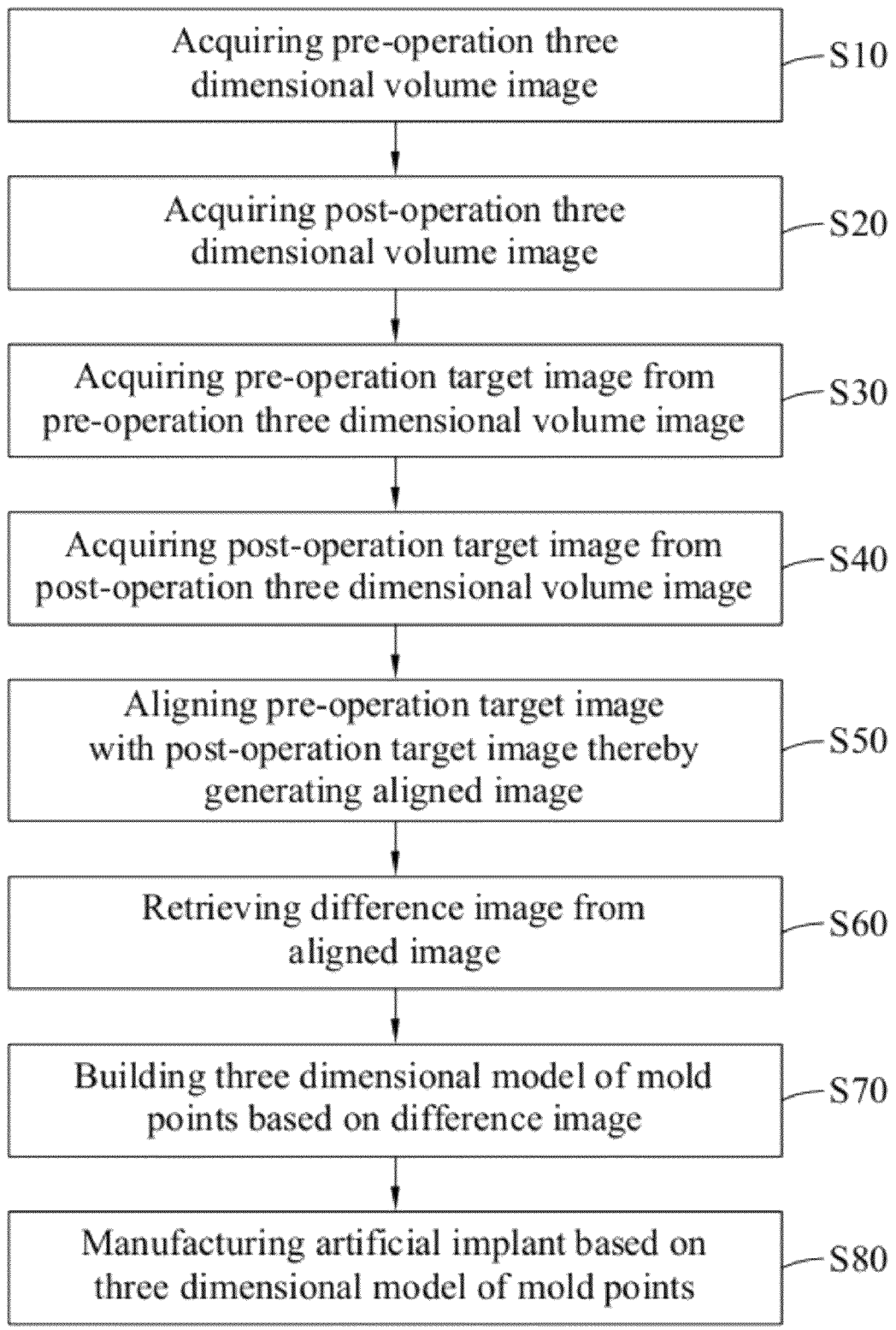
FIG. 1 is a flowchart of the method for manufacturing artificial implants according to the present invention.
Figure 2:
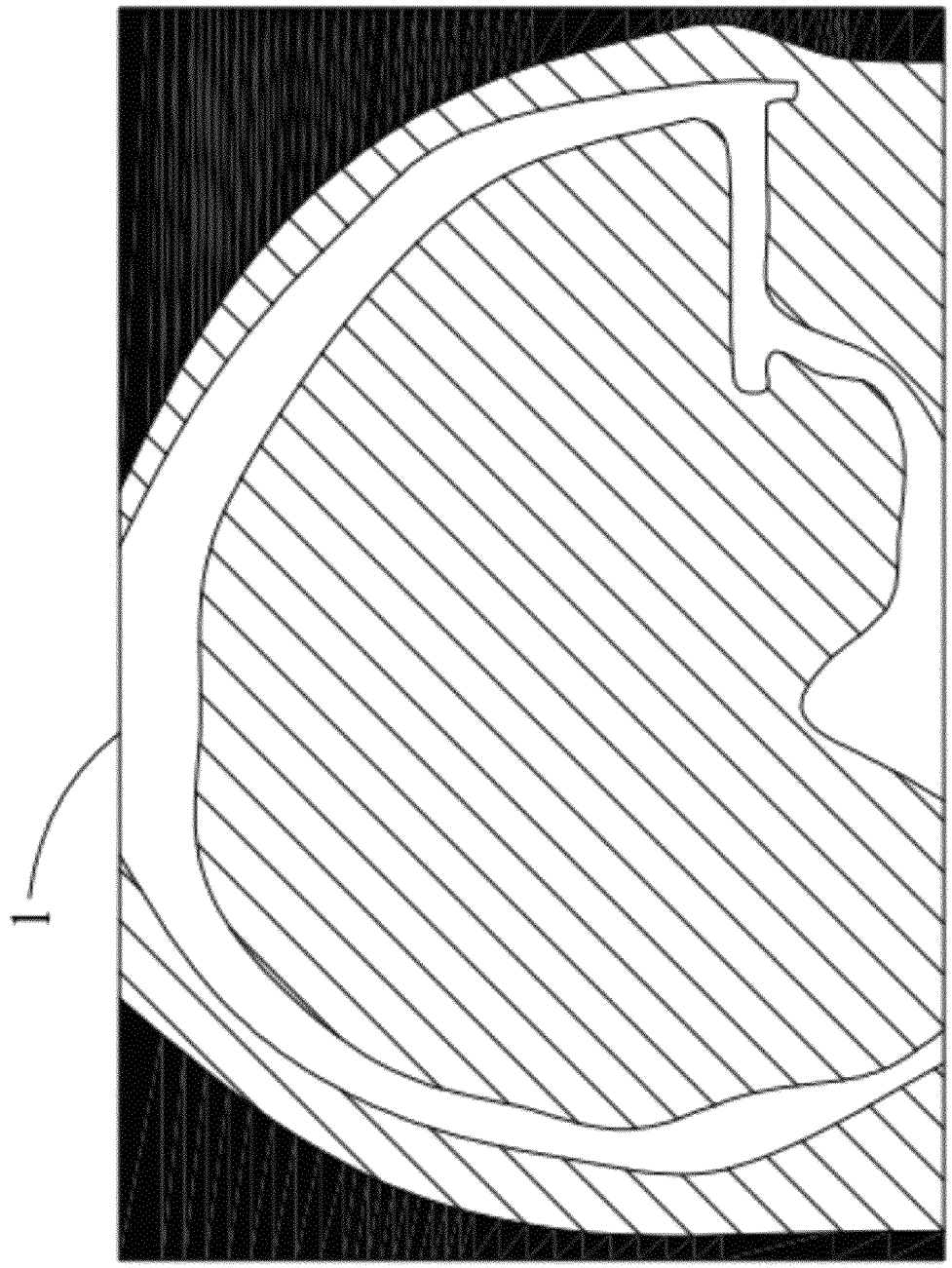
FIG. 2 is a sagittal cross-section view of the pre-operation three dimensional volume image according to an embodiment of the present invention.
Figure 3:
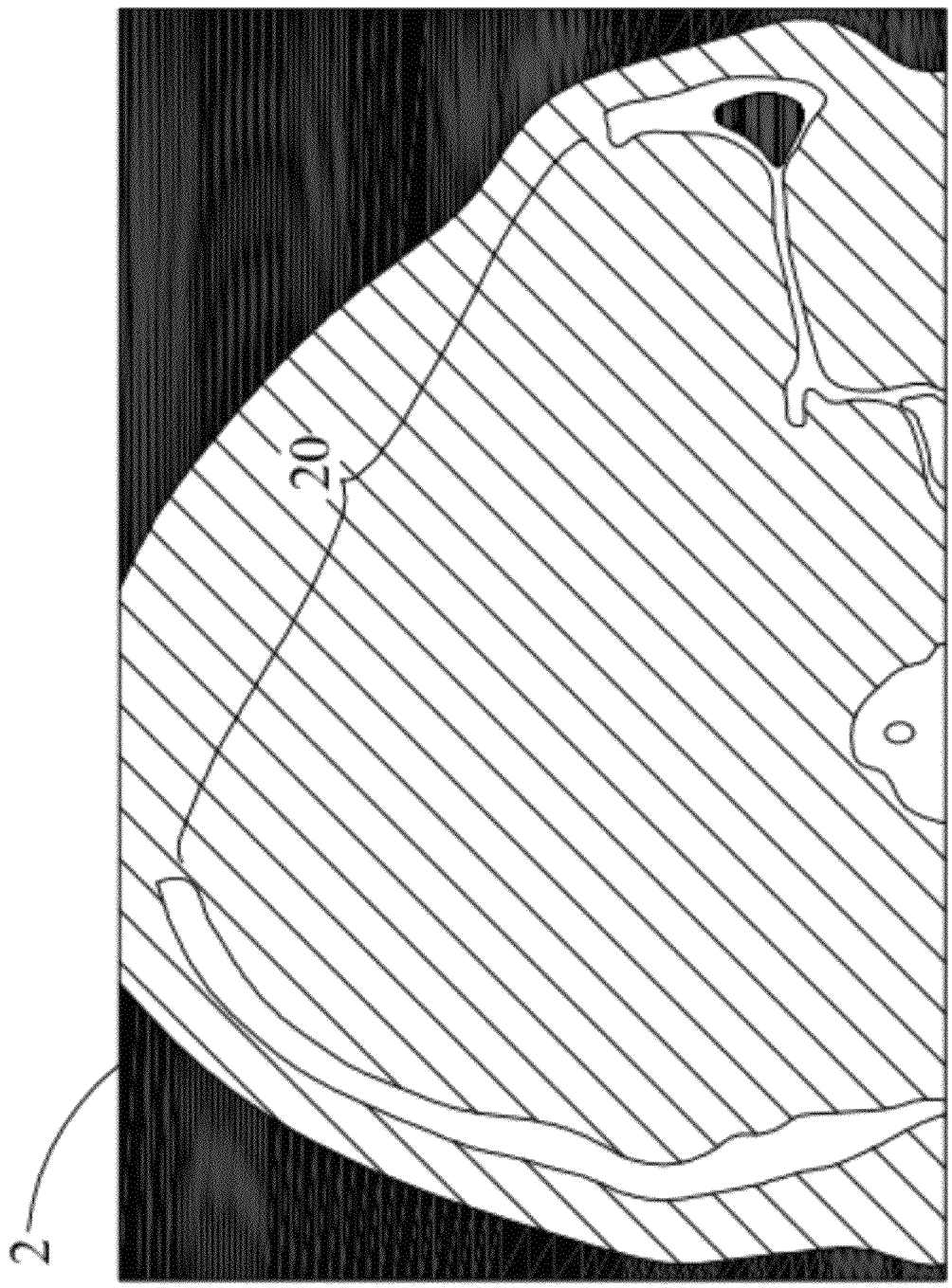
FIG. 3 is a sagittal cross-section view of the post-operation three dimensional volume image according to an embodiment of the present invention.
Figure 4:
FIG. 4 is a sagittal cross-section view of the pre-operation target image according to an embodiment of the present invention.
Figure 5:
FIG. 5 is a sagittal cross-section view of the post-operation target image according to an embodiment of the present invention.
Figure 6:
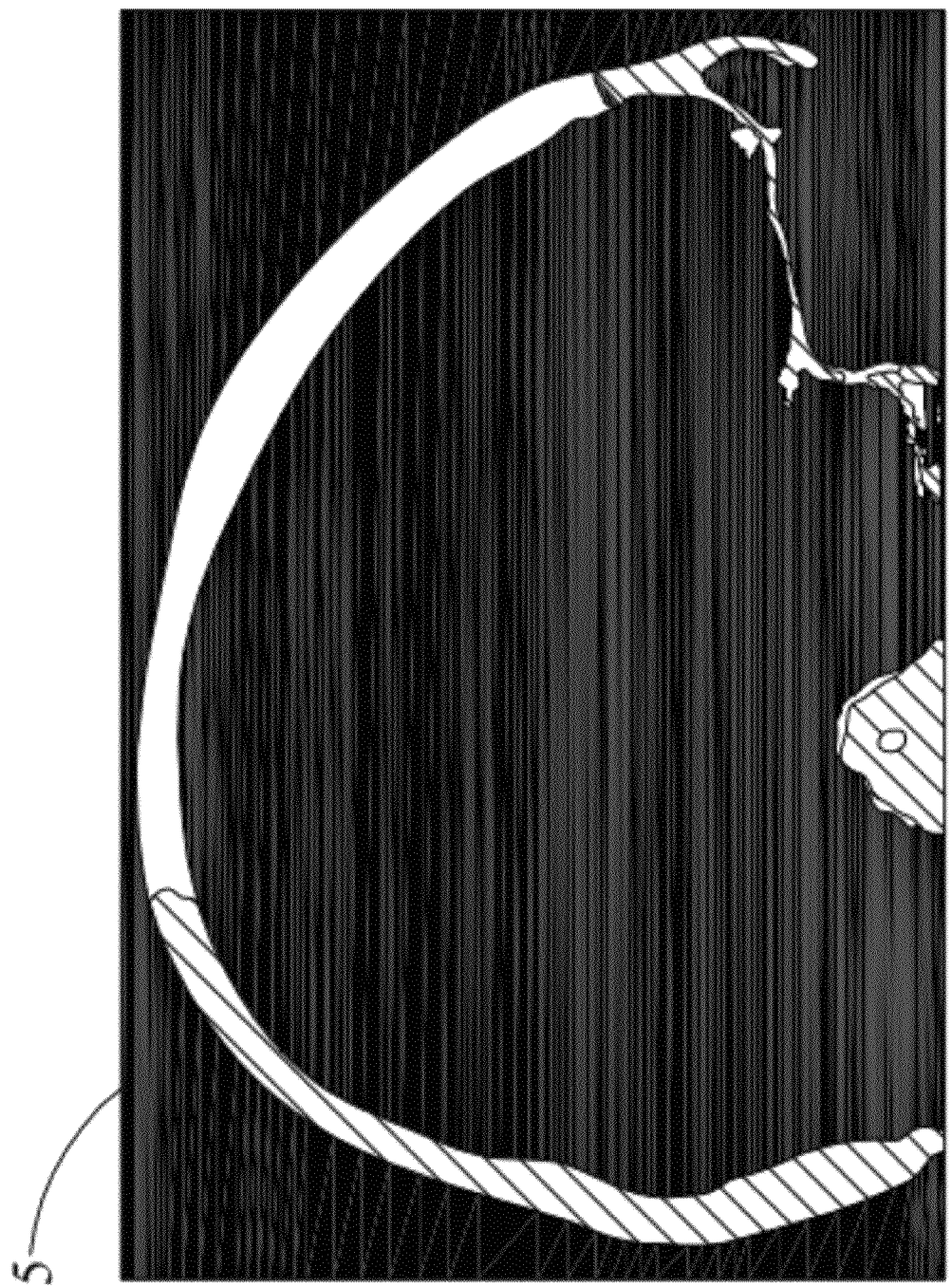
FIG. 6 is a sagittal cross-section view of the aligned image according to an embodiment of the present invention.
Figure 7:
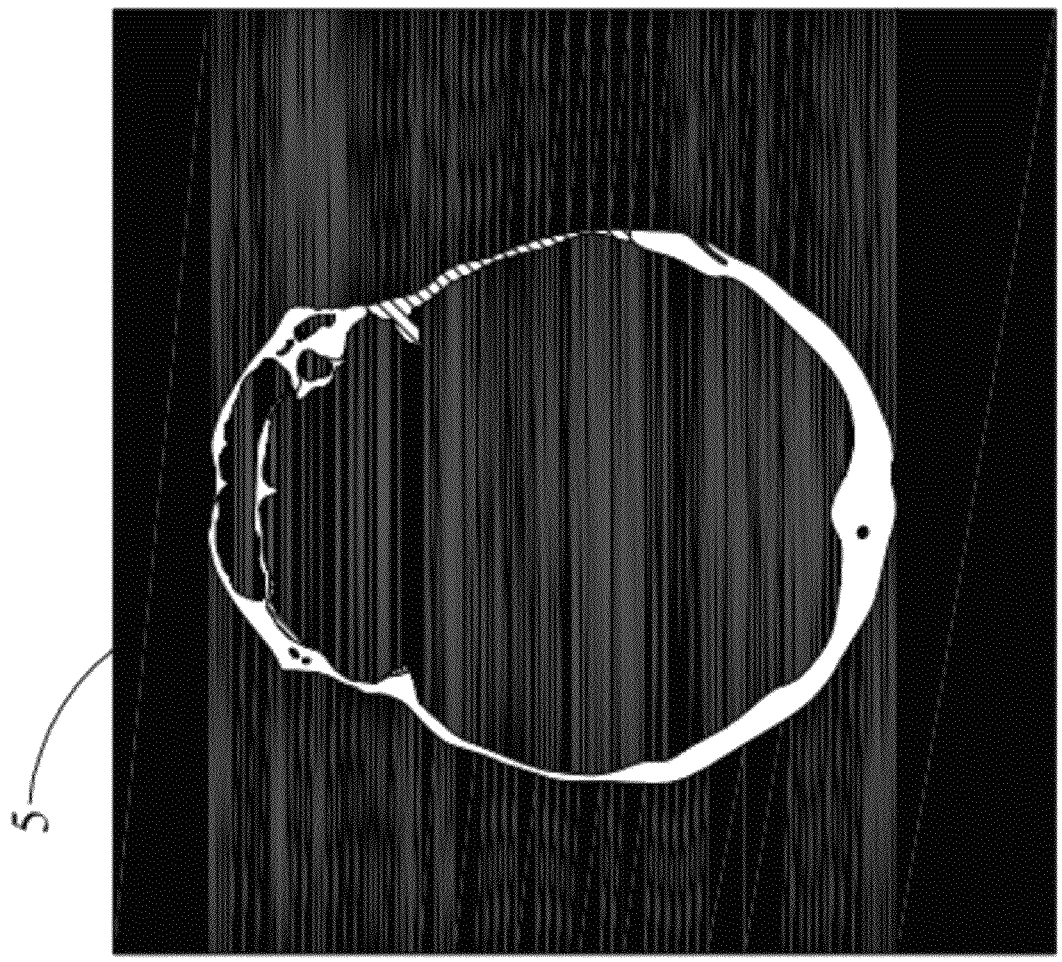
FIG. 7 is a horizontal cross-section view of the aligned image according to an embodiment of the present invention.
Figure 8:
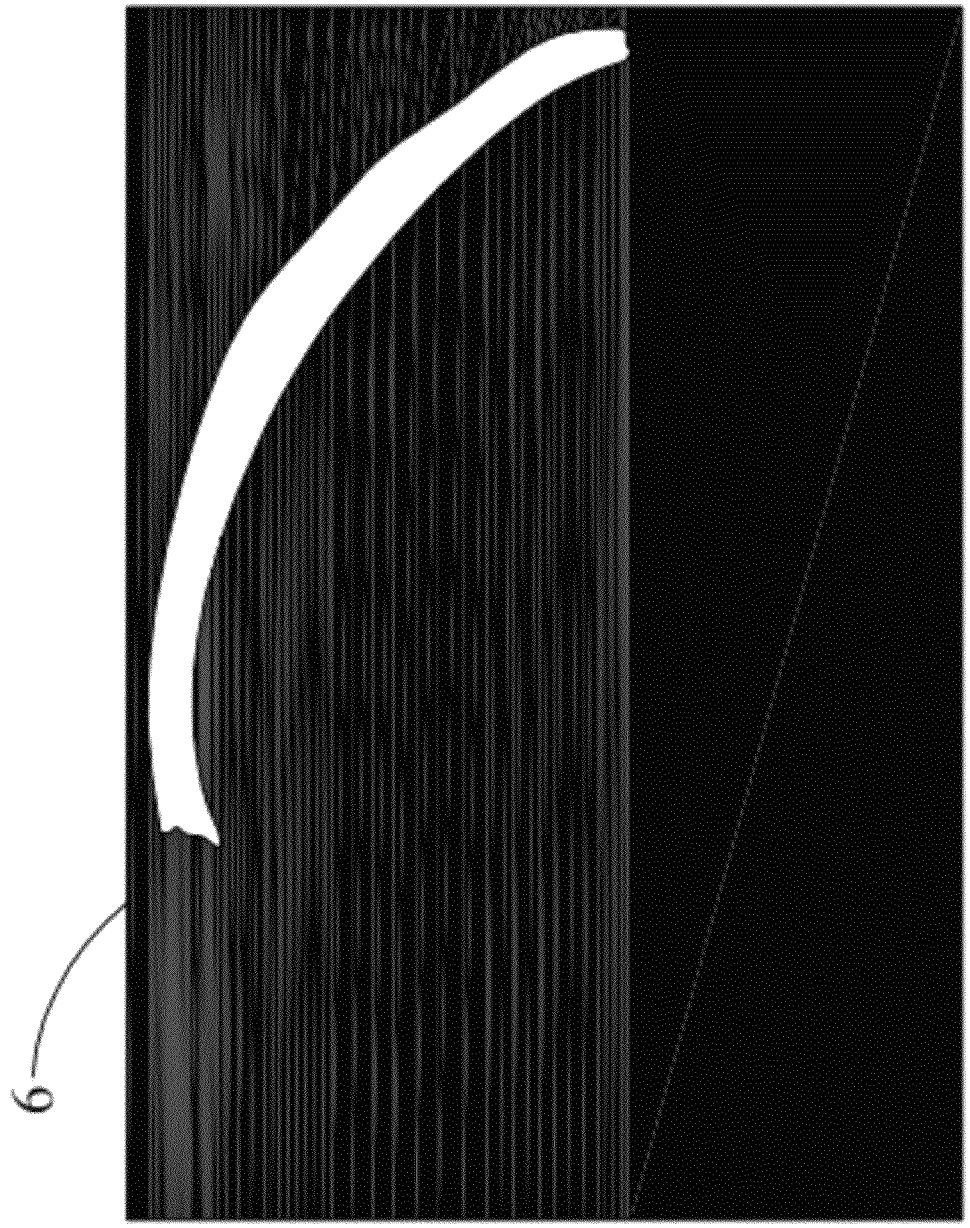
FIG. 8 is a diagram of the difference image according to an embodiment of the present invention.
Figure 9:
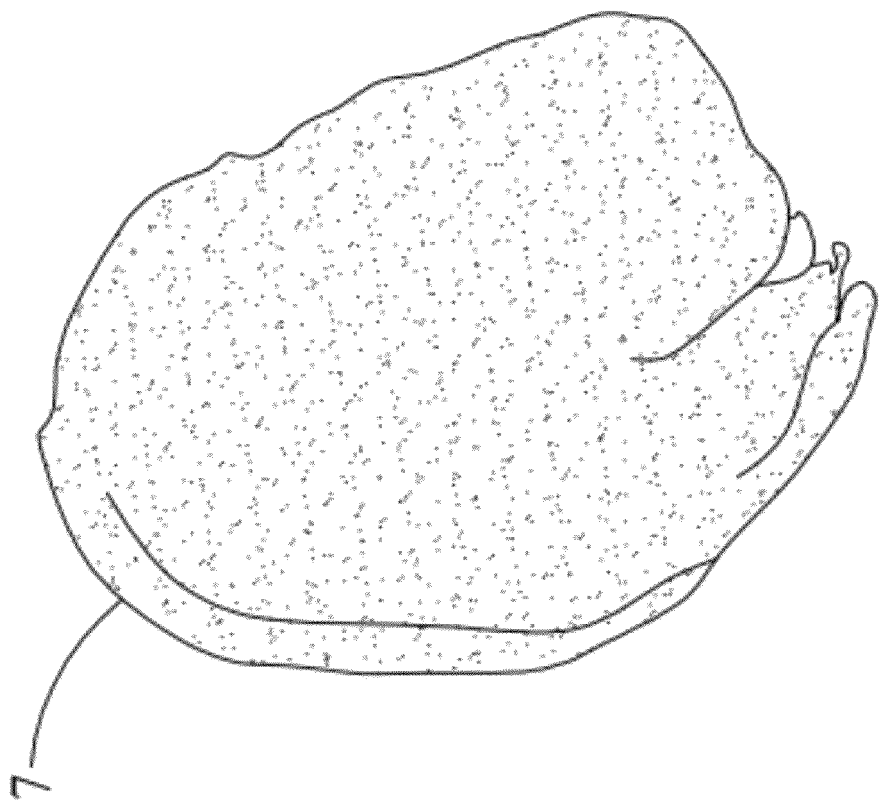
FIG. 9 is a diagram of the three dimensional model of mold points according to an embodiment of the present invention.

Refer now to FIG. 1, wherein a flowchart of the method for manufacturing artificial implants according to the present invention is shown. In the Figure, the artificial implant is manufactured by means of the method as the following steps illustrated hereunder:

(S10) acquiring the pre-operation three dimensional volume image 1 (as shown in FIG. 2), in which the pre-operation three dimensional volume image 1 comprises the original appearance of a target at the operation portion before incision;

(S20) acquiring the post-operation three dimensional volume image 2 (as shown in FIG. 3), in which the post-operation three dimensional volume image 2 comprises the post-operation appearance of the target at the operation portion after incision, such post-operation appearance having at least one incised part 20 on the target, compared with the original appearance thereof;

(S30) acquiring the pre-operation target image 3 from the pre-operation three dimensional volume image 1 (as shown in FIG. 4), in which the pre-operation target image 3 is the (i) three dimensional volume image of the target before incision;

(S40) acquiring the post-operation target image 4 from the post-operation three dimensional volume image 2 (as shown in FIG. 5), in which the post-operation target image 4 is the three dimensional volume image of the target after incision;

(S50) aligning the pre-operation target image 3 with the post-operation target image 4, thereby generating an aligned image 5 (as shown in FIGS. 6 and 7);

(S60) retrieving a difference image 6 from the aligned image 5 corresponding to the incised part of the target which is the difference in the pre-operation target image 3 and the post-operation target image 4 (as shown in FIG. 8);

(S70) building a three dimensional model of mold points 7 of the incised part based on the difference image 6 (as shown in FIG. 9); and (S80) manufacturing an artificial implant having the same profile as the incised part 20 based on the three dimensional model of mold points 7.

Figure 10:
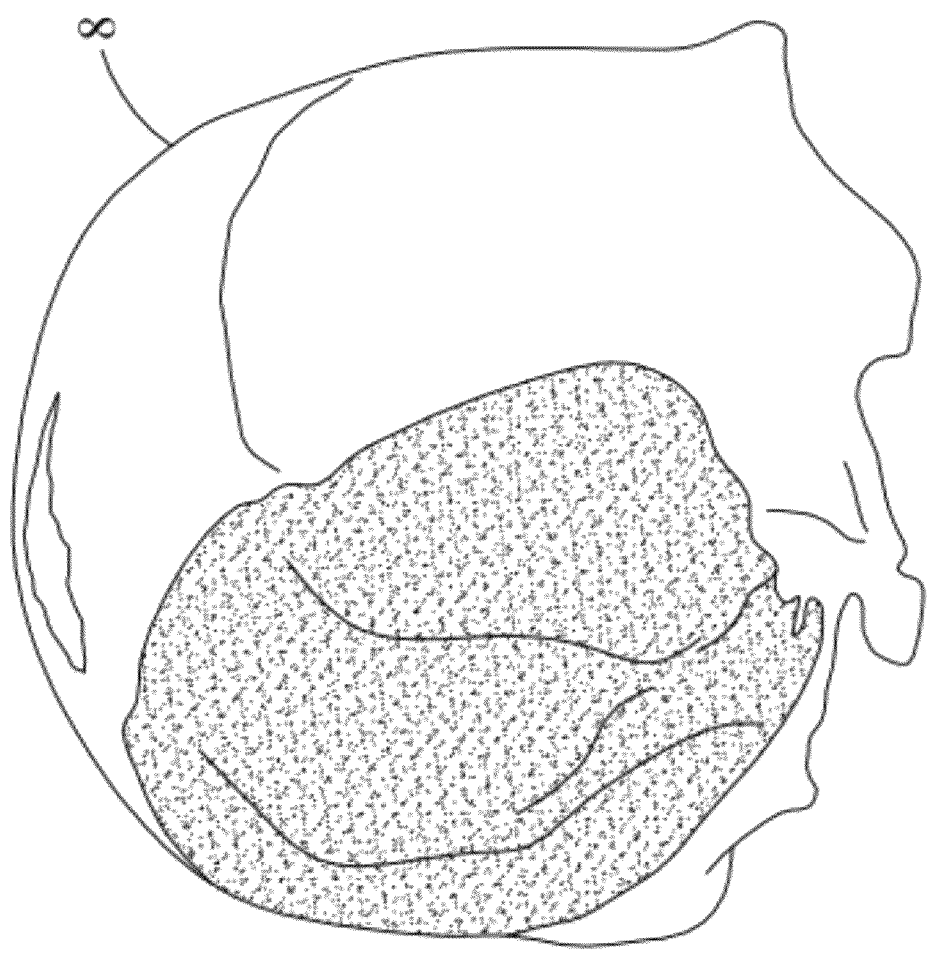
FIG. 10 is a diagram of the three dimensional reconstruction after recovery according to an embodiment of the present invention.

Refer next to FIG. 10, wherein a diagram of the three dimensional reconstruction after recovery according to an embodiment of the present invention is shown. The Figure shows a simulated image of implanting the artificial implant rebuilt in accordance with the three dimensional model of mold points 7 at the incised part of the post-operation target image 4. Since the artificial implant is fabricated based on the three dimensional model of mold points 7 of the incised part 20, the similarity between the artificial implant and the incised part 20 can be relatively satisfactory, thus achieving excellent match between the incised part 20 and the artificial implant 8 by implanting the artificial implant at the incised part 20, such that the difference in appearance of the operation portion before surgery and after surgery can be barely identified.

Figure 11:
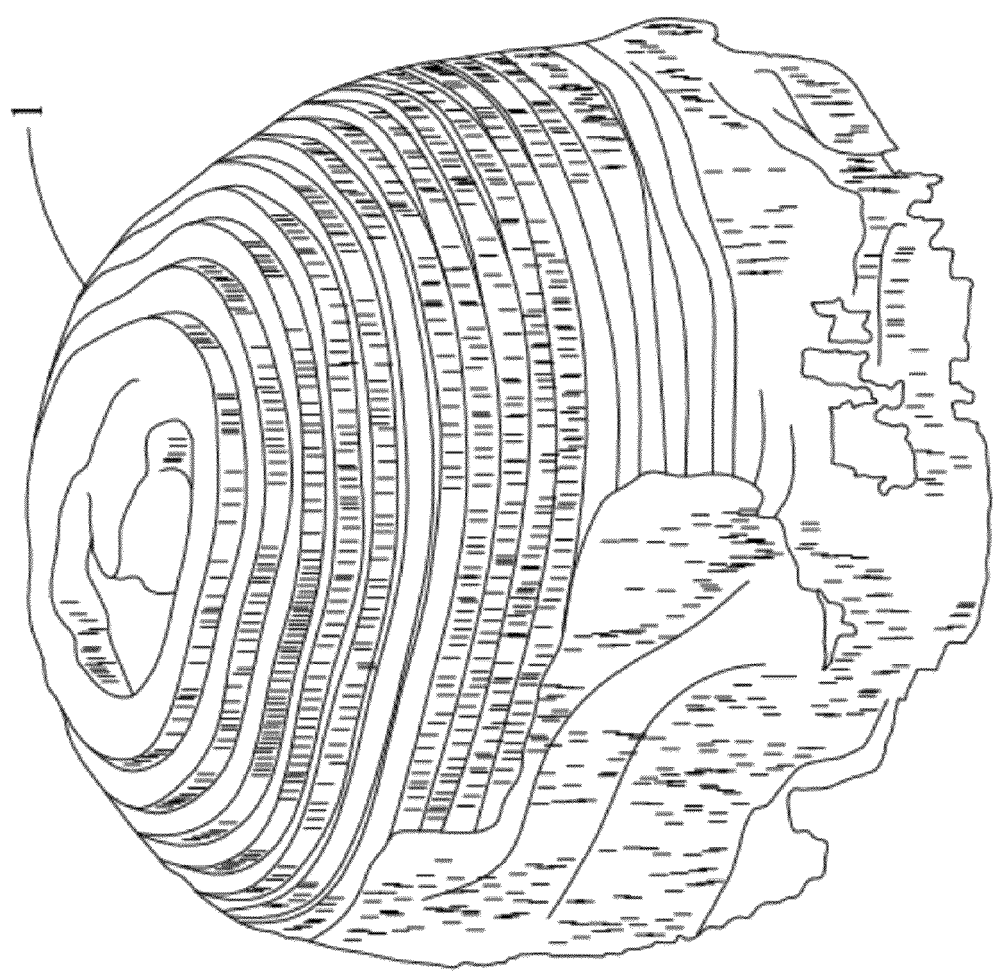
FIG. 11 is a diagram of the low resolution three dimensional reconstruction for the pre-operation three dimensional volume image according to an embodiment of the present invention.
Figure 12:
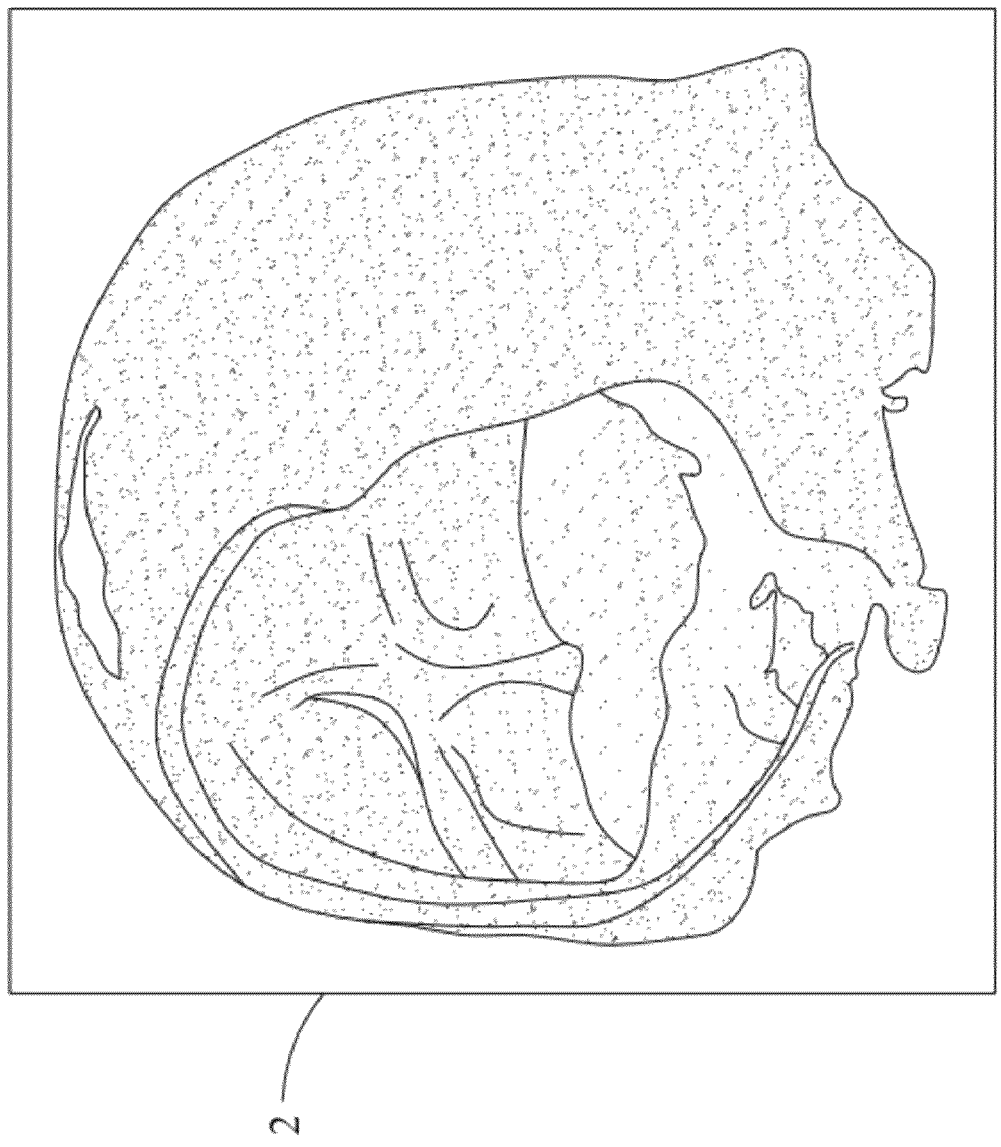
FIG. 12 is a diagram of the high resolution three dimensional reconstruction for the pre-operation three dimensional volume image according to an embodiment of the present invention.

In one embodiment of the present invention, the pre-operation three dimensional volume image 1 is a low resolution computed tomography image of the patient before operation (acquired at diagnosis), characterized in a matrix size of 512 (pixels)*512 (pixels)*32 (number of cross-sections), and a pixel size of 0.47 mm*0.47 mm*5 mm (thickness of cross-section), as referred to FIG. 11. The post-operation three dimensional volume image 2 is high resolution computed tomography image of the patient after operation, characterized in a matrix size of 512 (pixels)*512 (pixels)*184 (number of cross-sections), and a pixel size of 0.49 mm*0.49 mm*0.63 mm (thickness of cross-section), as referred to FIG. 12. Since the number of cross-sections of the pre-operation three dimensional volume image 1 is 32, with greater thickness in each cross-section (the thickness thereof is 5 mm), it tends to generate the partial volume effect, as the ladder-like portions shown in the FIG. 14.

Figure 13:
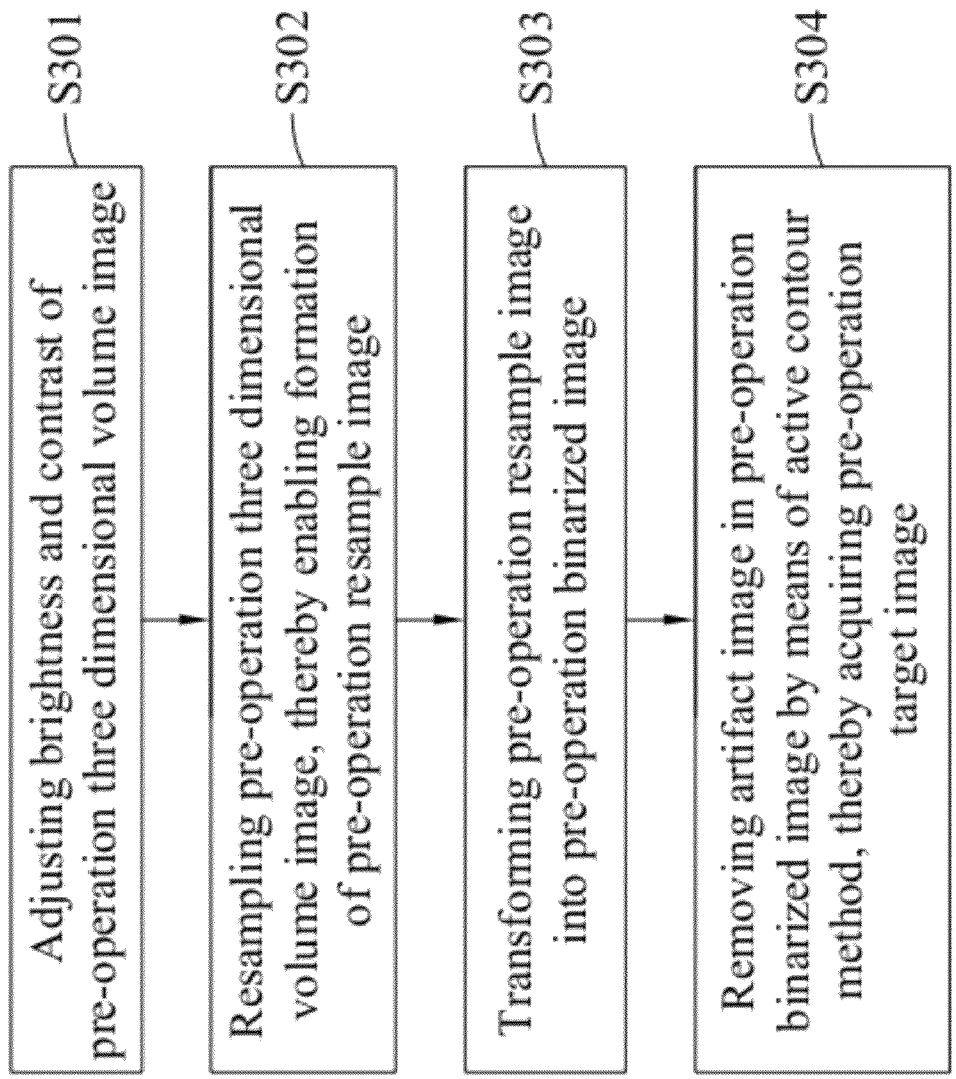
FIG. 13 is a flowchart of acquiring the pre-operation target image in the pre-operation three dimensional volume image according to an embodiment of the present invention.
Figure 14:
FIG. 14 is a diagram of the pre-operation binarized image according to an embodiment of the present invention.

In other word, suppose the resolution of the pre-operation three dimensional volume image 1 is lower than the resolution of the post-operation three dimensional volume image 2, and the cross-section thickness of the pre-operation three dimensional volume image 1 is greater than the cross-section thickness of the post-operation three dimensional volume image 2, the image resolution may undesirably become inconsistent, and consequently, it is unable to directly retrieve the pre-operation target image 3, which is identically located in the post-operation target image 4, from the pre-operation three dimensional volume image 1. As a result, referring to FIG. 13, in the present embodiment, the step of acquiring the pre-operation target image 3 from the pre-operation three dimensional volume image 1 further comprises the following steps:

(S301) adjusting the brightness and contrast of the pre-operation three dimensional volume image 1, thereby allowing to appropriately distinguish the target shown in the pre-operation three dimensional volume image 1 (cranium is taken as the example in the present embodiment, but not limited thereto);

(S302) resampling the pre-operation three dimensional volume image 1, thereby modifying the resolution of the pre-operation three dimensional volume image 1 such that the resolution thereof is identical to the post-operation three dimensional volume image 2, thus enabling formation of a pre-operation resample image;

(S303) applying a thresholding method on the aforementioned pre-operation resample image to distinguish the target from background, and transforming the pre-operation resample image into the pre-operation binarized image 11 by means of the binarization method (as shown in FIG. 14), in which the value 1 in the pre-operation binarized image 11 indicates the target (e.g., cranium), while 0 is deemed as background; and (S304) removing the artifact image in the pre-operation binarized image 11 generated due to the partial volume effect by means of active contour method, thereby acquiring the pre-operation target image 3 (as shown in FIG. 4).

Figure 15:
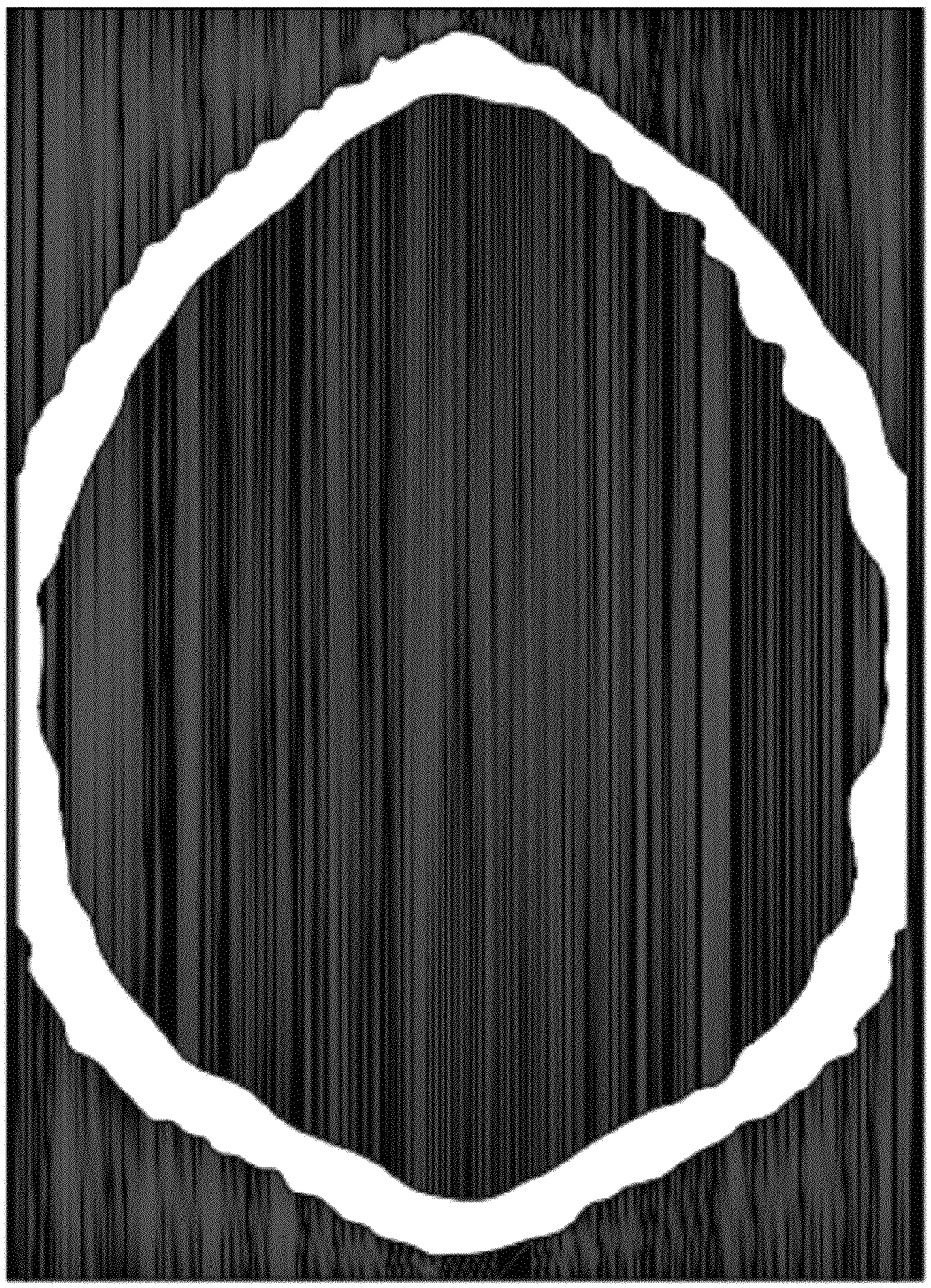
FIG. 15 is a diagram of closed profile according to an embodiment of the present invention.

Since the profile in the pre-operation binarized image 11 is not closed, in the present embodiment, before applying the active contour method in order to remove the artifact image in the pre-operation binarized image 11, it first forms a closed profile from the profile of a portion of the target in the pre-operation binarized image 11 (e.g., the upper half in the pre-operation binarized image 11 of the sagittal cross-section view and the coronary cross-section view) by means of the mirroring method (as shown in FIG. 15), and then applies the active contour method on the inner edge and outer edge of the closed profile, thereby generating the pre-operation target image 3.

In the present embodiment, when applying the active contour method on the inner edge of the target (e.g., cranium) in the pre-operation binarized image 11, it first executes the image dilation of two pixels on the pre-operation binarized image 11, and in addition, when applying the active contour method on the outer edge of the target (e.g., cranium) in the pre-operation binarized image 11, it first executes the image erosion of two pixels on the pre-operation binarized image 11, in order to encapsulate the recessed profile, rather than the bumped profile, of the pre-operation binarized image 11, thereby generating the pre-operation target image 3 (as shown in FIG. 4).

In summary of the texts set forth hereinbefore, after the processes as above, it is possible to retrieve the pre-operation target image 3 of the same resolution as the post-operation target image 4 from the pre-operation three dimensional volume image 1.

In the aforementioned embodiment of the present invention, the parameters which can be set in the active contour method include number of iterations, step interval, elasticity and rigidity and the like, wherein the number of iterations is 200 times, the step interval is 0.1, the elasticity is the square of the spatial discrete level, and the rigidity is the spatial discrete level to the power of four.

Figure 16:
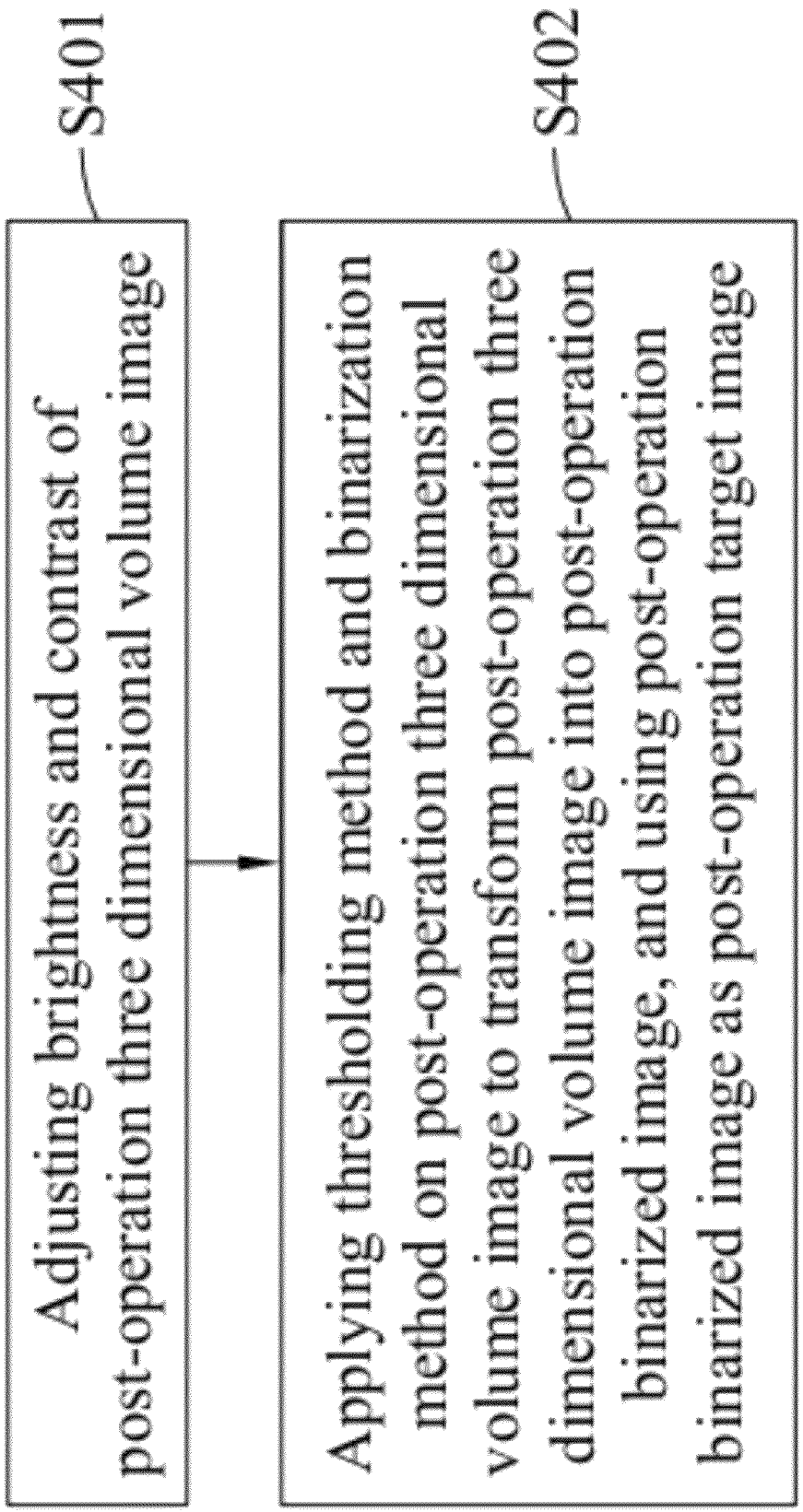
FIG. 16 is a flowchart of generating the post-operation target image according to yet another embodiment of the present invention.

In yet another embodiment of the present invention, referring to FIG. 16, a flowchart of generating the post-operation target image 4 is shown, comprising the following steps:

(S401) adjusting the brightness and contrast of the post-operation three dimensional volume image 2, thereby allowing to appropriately distinguish the target shown in the post-operation three dimensional volume image 2 (cranium, for example); and (S402) applying the thresholding method on the post-operation three dimensional volume image 2 in order to distinguish the target from background, and transforming the post-operation three dimensional volume image 2 into the post-operation binarized image by means of the binarization method, in which the value 1 in the post-operation binarized image indicates the target, while 0 is deemed as background, and then using the post-operation binarized image as the post-operation target image 4.

In the aforementioned embodiments of the present invention, the pre-operation three dimensional volume image 1 is a computed tomography image, and the brightness of the computed tomography image is represented by the computed tomography value (CT value, in Hounsfield unit (HU)). The CT values of various tissues are respectively within a certain range, thereby enabling identification of different tissues. Taking the bone as the incised part for example, the CT value is between 1400~3000 HU, therefore, in the above-said embodiments of the present invention, the CT value used to distinguish the cranial part from background may be set to be 1400~3000 HU.

Figure 17:
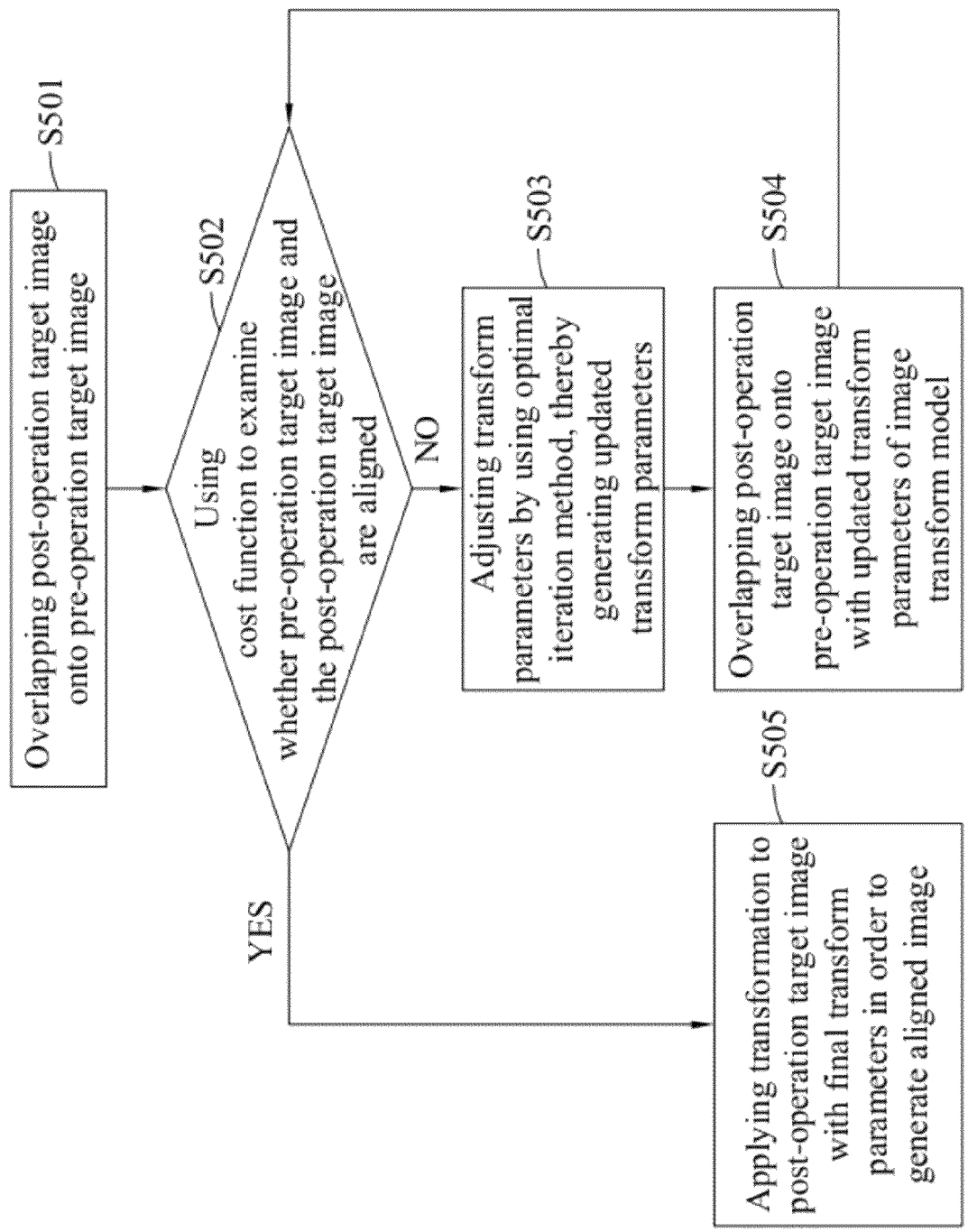
FIG. 17 is a flowchart of generating the aligned image according to still another embodiment of the present invention.
Figure 18:
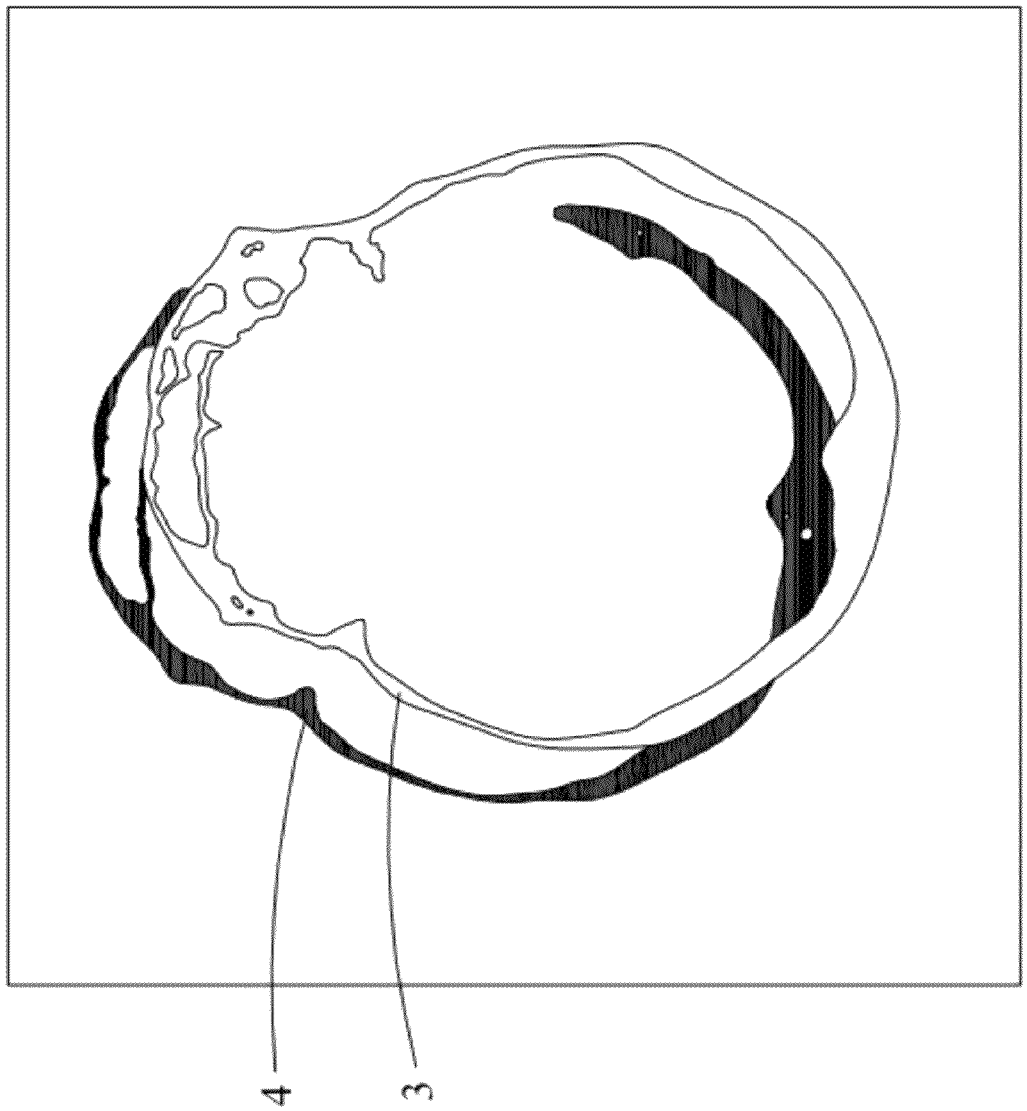
FIG. 18 is a diagram showing the post-operation target image overlapped onto the pre-operation target image according to still another embodiment of the present invention.

In still another embodiment of the present invention, referring to FIG. 17, a flowchart of generating the aligned image is shown, comprising the following steps:

(S501) overlapping the post-operation target image 4 onto the pre-operation target image 3 based on the initial transform parameters of an image transform model (as shown in FIG. 18);

(S502) using a cost function to examine whether the pre-operation target image 3 and the post-operation target image 4 are aligned: first, calculating the difference of the intensity values between the target in the post-operation target image 4 and the one in the pre-operation target image 3; squaring and then summing such difference of the intensity values into a sum of squared difference (SSD); and then, if the SSD is smaller than a preset value, performing the step (S505), otherwise performing the step (S503);

(S503) adjusting the transform parameters by using the optimal iteration method, thereby generating the updated transform parameters;

(S504) overlapping the post-operation target image 4 onto the pre-operation target image 3 with the updated transform parameters of the image transform model, then examining the alignment according to the step (S502); and (S505) applying the transformation to the post-operation target image 4 with the final transform parameters in order to generate the aligned image 5 (as shown in FIGS. 6, 7).

In such a yet another embodiment, the aforementioned image transform model is an affine transform model, and the transform parameters of the affine transform model may include translation, rotation, scaling and skewing, etc. Besides, the optimal iteration method applies the Powell method to sequentially select the appropriate converging direction per iteration, so as to gradually reduce the SSD generated from the evaluation of the cost function, thereby allowing the SSD to be smaller than the preset value.

Additionally, in the present yet another embodiment, when using the cost function and before calculating the SSD, it first examines whether the post-operation target image transformed by means of the image transform model falls outside the whole volume (512*512*184 pixels) of the pre-operation target image; if yes, then a punishment value is added when calculating the cost function; otherwise, the cost function is directly used to figure out the SSD. Herein assuming that the field ranges of the post-operation target image 4 and the pre-operation target image 3 are quite similar, as a result, for each target in the post-operation target image 4, it is likely to find a corresponding counterpart thereof in the pre-operation target image 3; in this case, the punishment value may be given a greater value. Contrarily, suppose the situations that some corresponding cranial portions may not be located are tolerable, the punishment value may be set to a smaller value.

Figure 19:
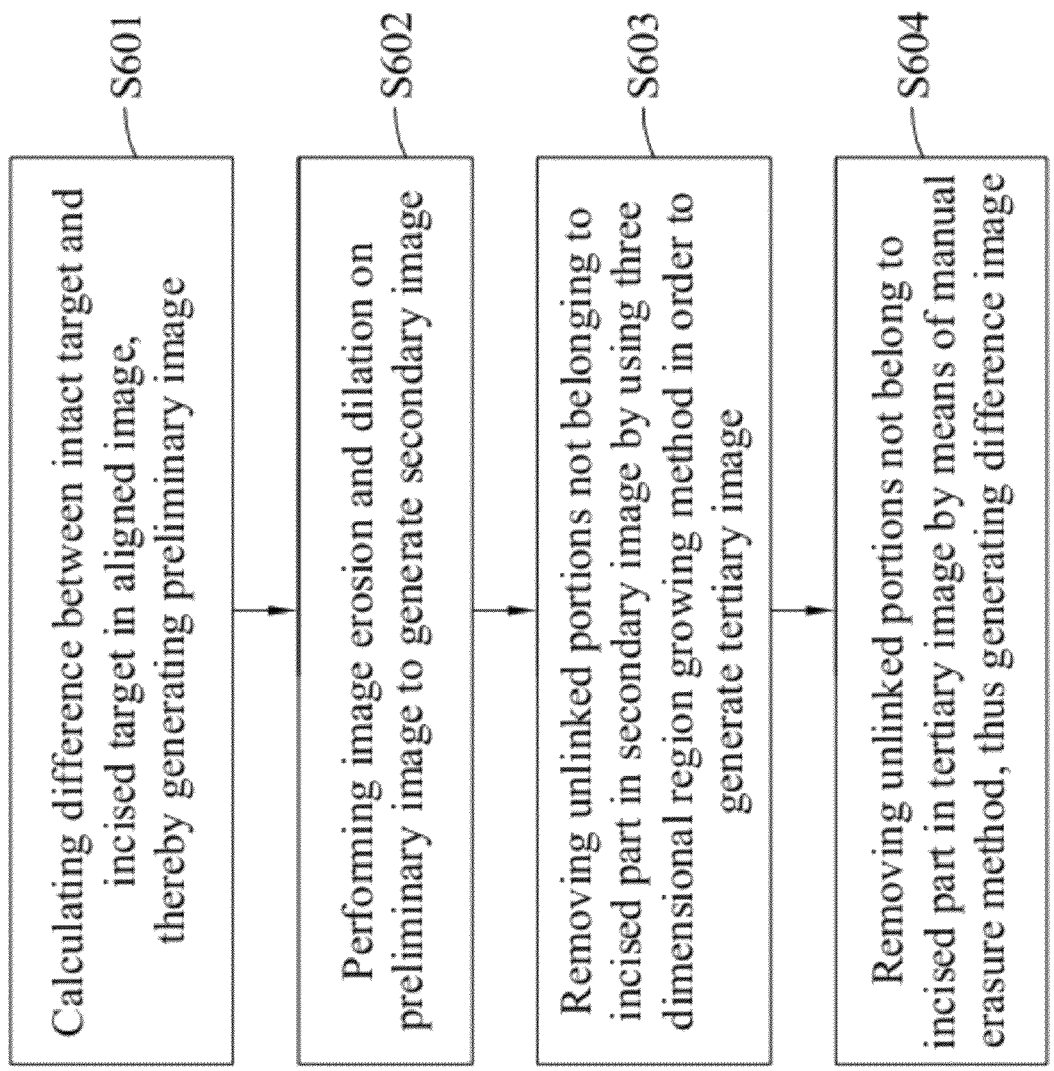
FIG. 19 is a flowchart of generating the difference image from the aligned image according to still another embodiment of the present invention.
Figure 20:
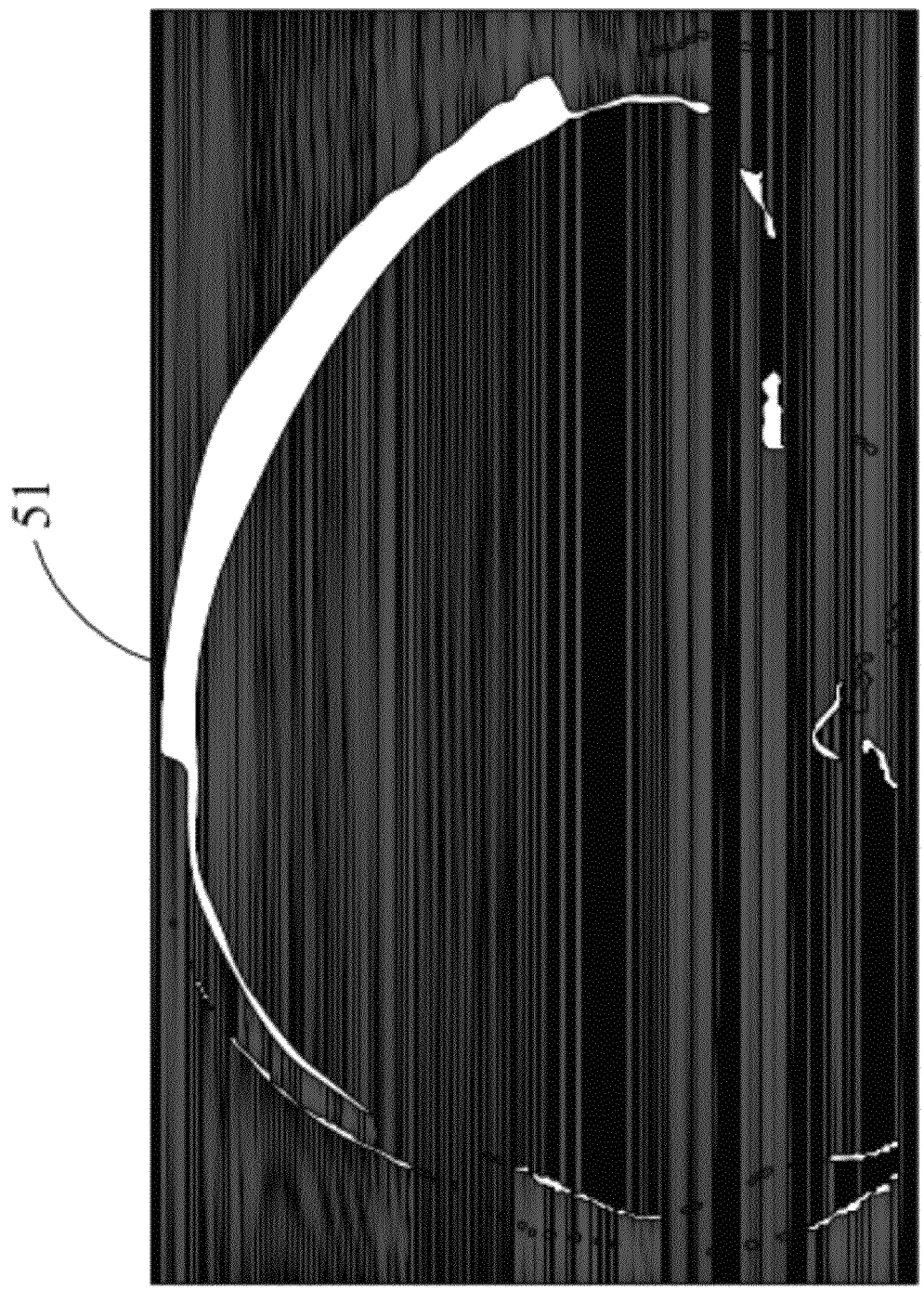
FIG. 20 is a diagram of the preliminary image according to still another embodiment of the present invention.
Figure 21:
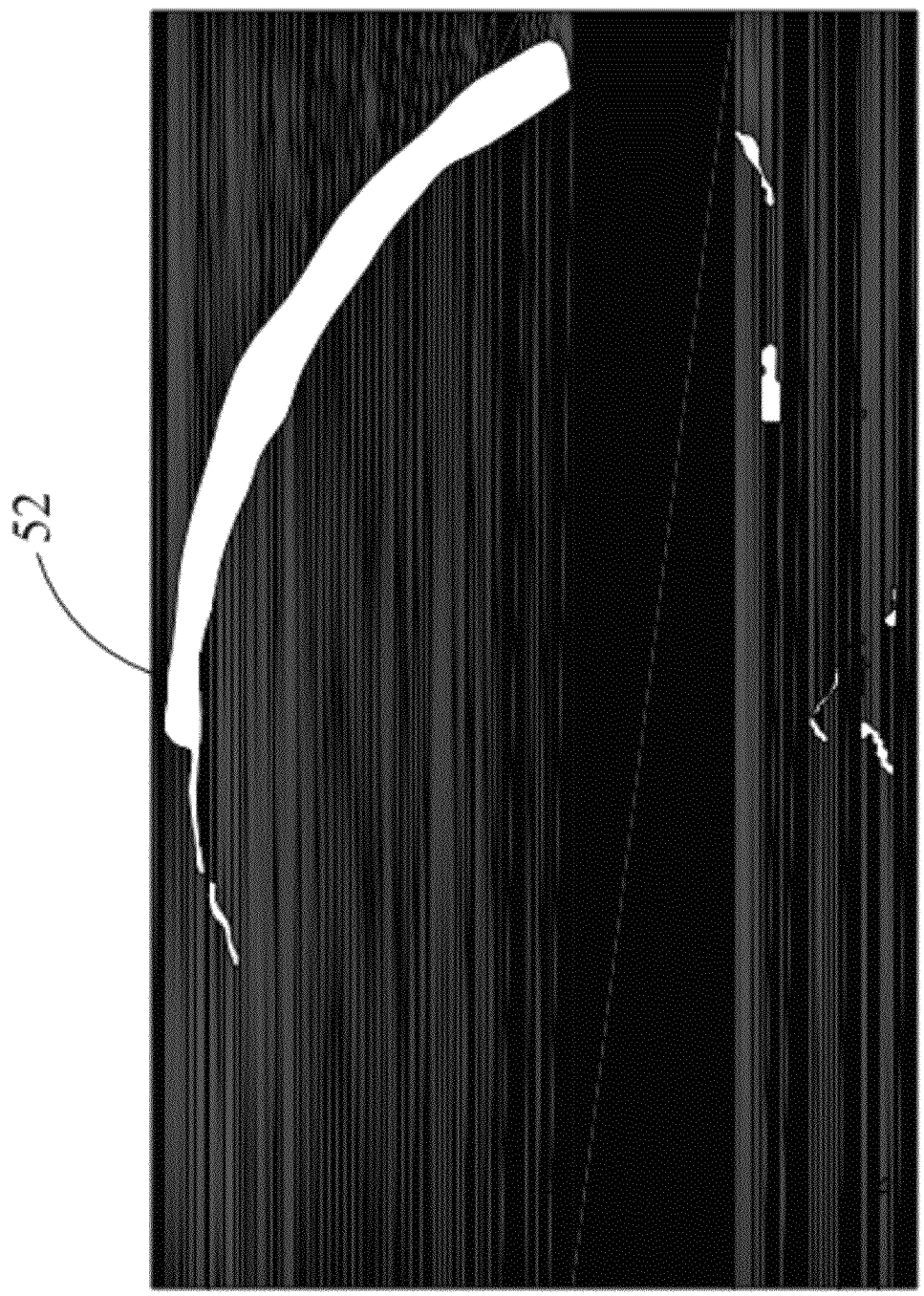
FIG. 21 is a diagram of the secondary image according to still another embodiment of the present invention.
Figure 22:
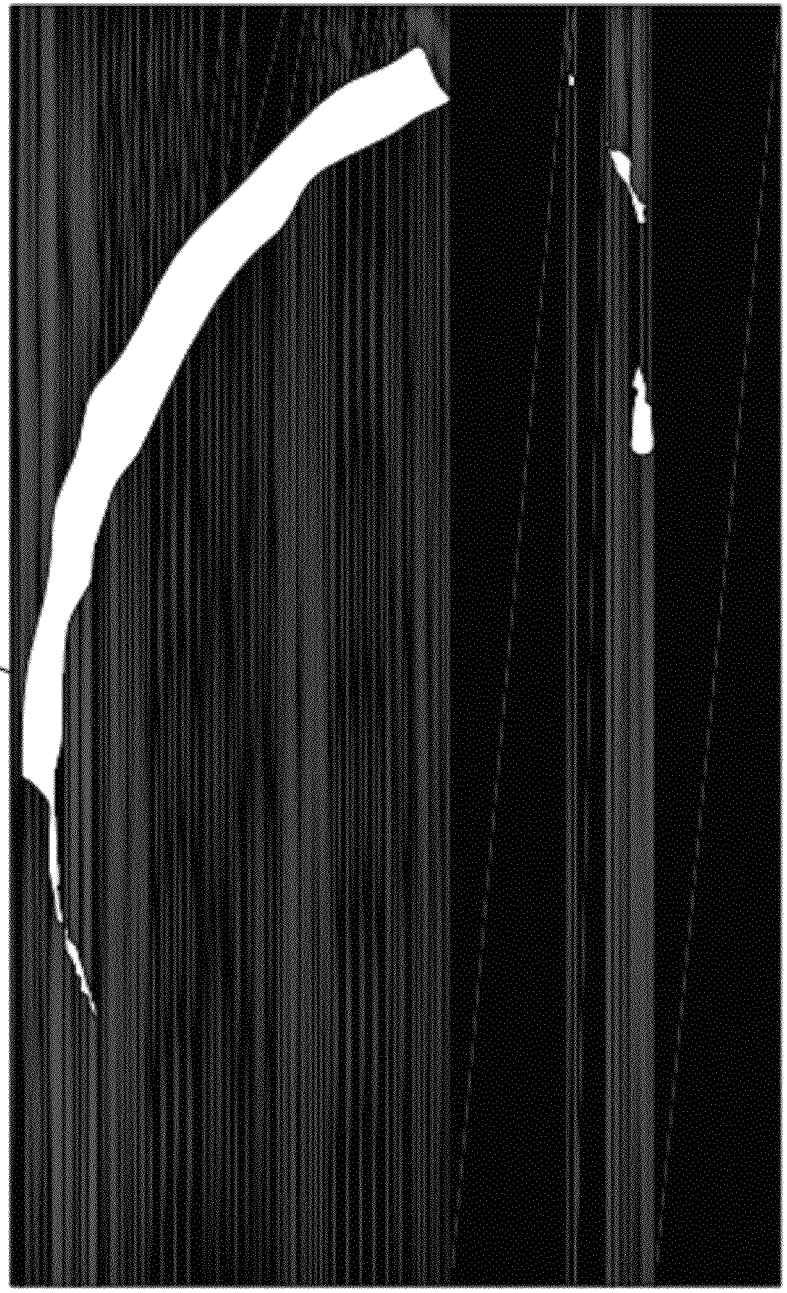
FIG. 22 is a diagram of the tertiary image according to still another embodiment of the present invention.
Figure 23:
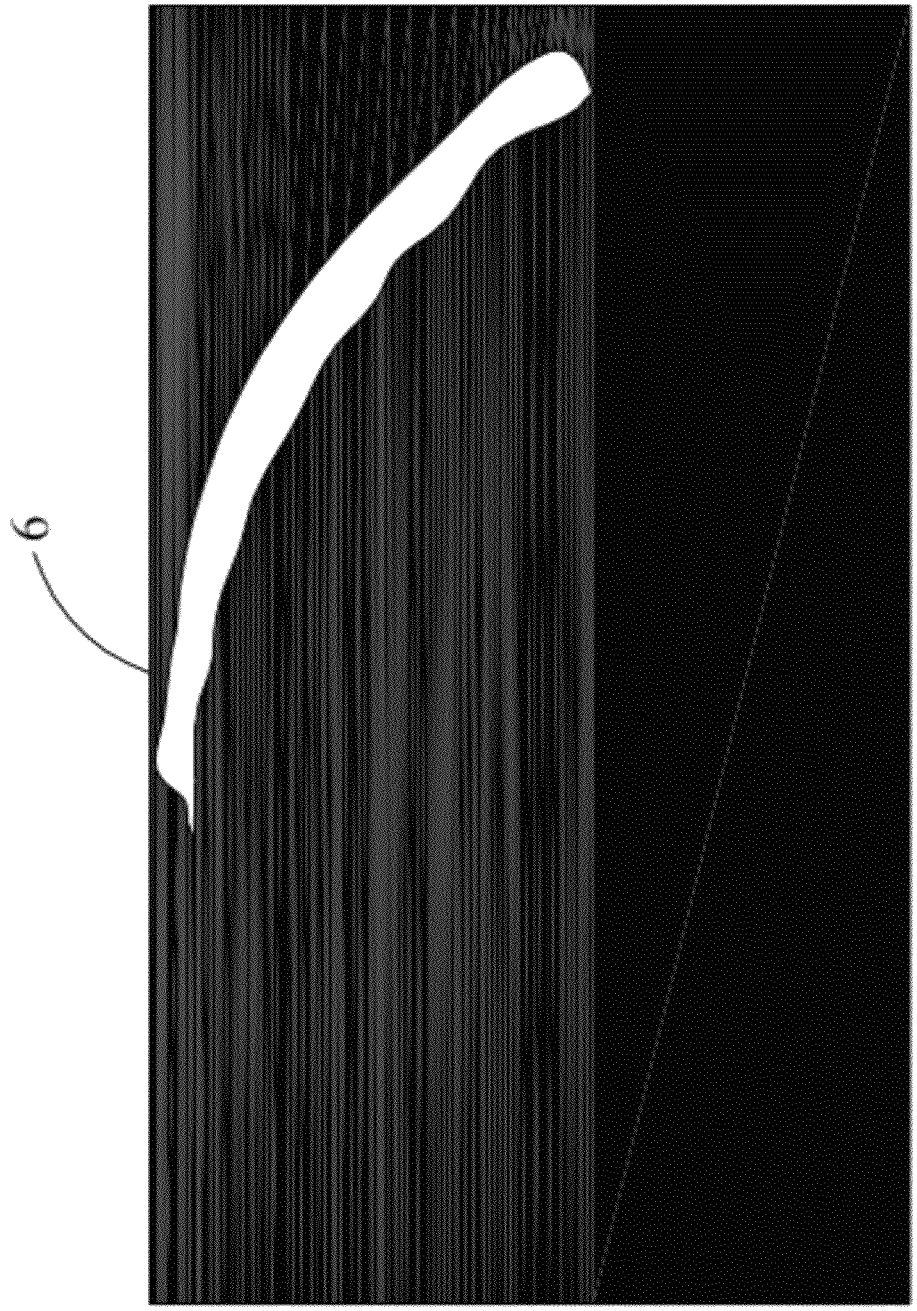
FIG. 23 is a diagram of the difference image according to still another embodiment of the present invention.

Refer now to FIG. 19, wherein a flowchart of generating the difference image from the aligned image according to still another embodiment of the present invention is shown, comprising the following steps:

(S601) calculating the difference between the intact target and the incised target in the aligned image 5, thereby generating a preliminary image 51 (as shown in FIG. 20);

(S602) performing image erosion and dilation on the upper half of the preliminary image 51 by using the first structure element matrix, and performing image erosion and dilation on the lower half of the preliminary image 51 by using the second structure element matrix, so as to remove the portions of small residuals in the preliminary image and thus generate a secondary image 52 (as shown in FIG. 21), in which the numbers of rows and columns in the first structure element matrix exceed the second structure element matrix;

(S603) removing the unlinked portions not belonging to the incised part in the secondary image 52 by using three dimensional region growing method in order to generate the tertiary image 53 (as shown in FIG. 22); and (S604) removing the unlinked portions not belong to the incised part in the tertiary image 53 by means of manual erasure method, thus generating the difference image 6 (as shown in FIG. 23).

In this yet another embodiment, the first structure element matrix is a 5×5 matrix, which is defined as:

$$\begin{bmatrix} 0 & 0 & 1 & 0 & 0 \\ 0 & 1 & 1 & 1 & 0 \\ 1 & 1 & 1 & 1 & 1 \\ 0 & 1 & 1 & 1 & 0 \\ 0 & 0 & 1 & 0 & 0 \end{bmatrix}.$$

The second structure element matrix is a 3×3 matrix including the following contents:

$$\begin{bmatrix} 0 & 1 & 0 \\ 1 & 1 & 1 \\ 0 & 1 & 0 \end{bmatrix}.$$

Figure 24:
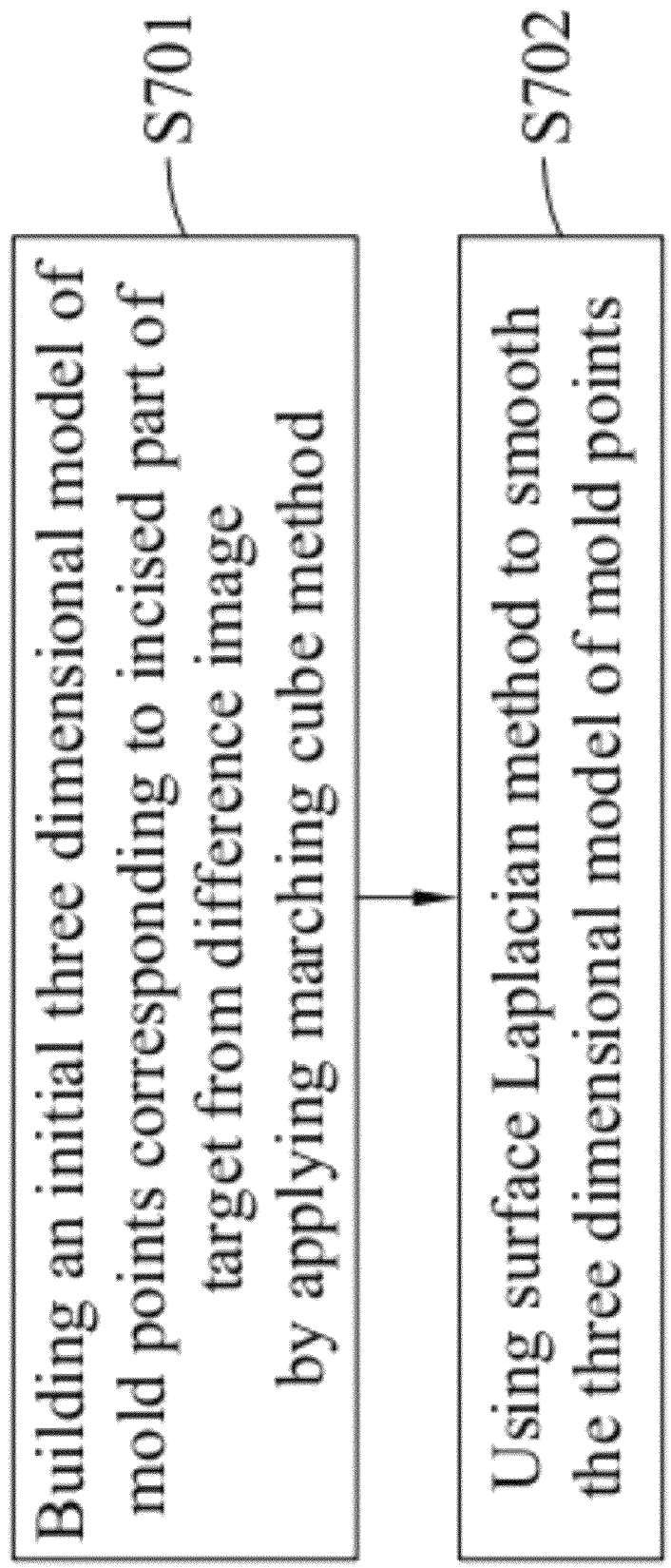
FIG. 24 is flowchart of generating three dimensional model of mold points according to still further another embodiment of the present invention.

Refer next to FIG. 24, in a still further another embodiment of the present invention, a flowchart of generating three dimensional model of mold points is shown, comprising the following steps:

(S701) building the initial three dimensional model of mold points corresponding to the incised part of the target from the difference image 6 by applying the marching cube method;

(S702) amending (smoothing) the initial three dimensional model of mold points by means of the surface Laplacian method, thus further streamlining the surface of the initial three dimensional model of mold points, allowing to generate the three dimensional model of mold points 7 having a smoother surface (as shown in FIG. 9).

Figure 25:
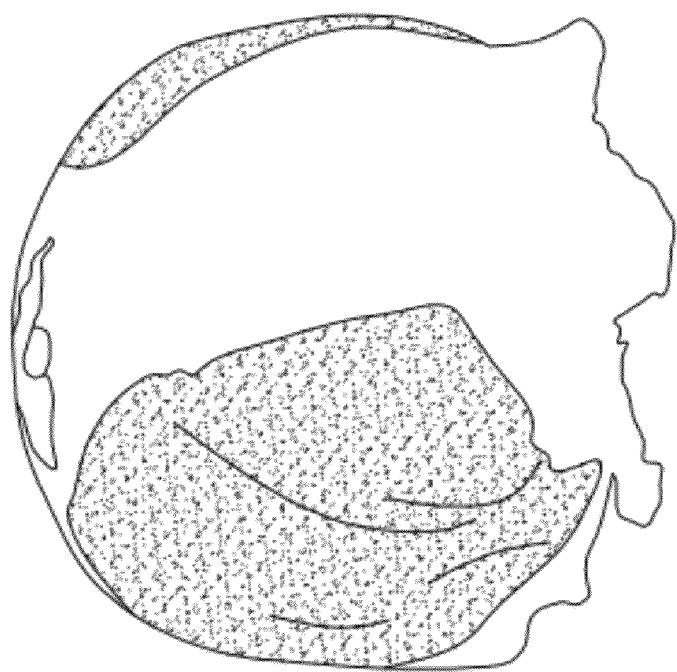
FIG. 25 is a diagram of three dimensional reconstruction after restoration by means of dual-sided cranial reconstruction operation.
Figure 25:
Figure 25:
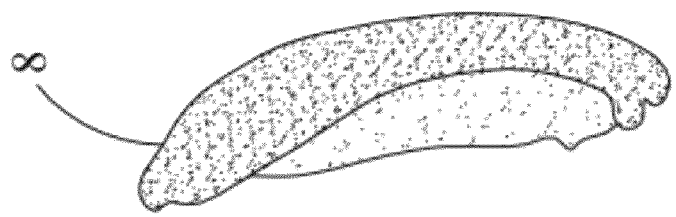
Figure 25:
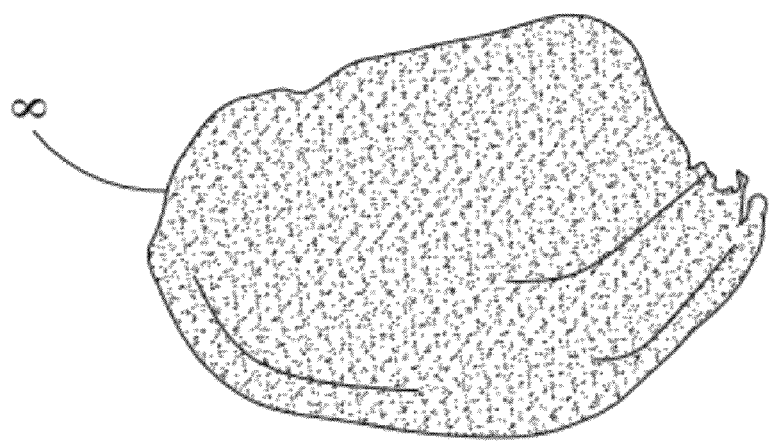

In the aforementioned embodiments of the present invention, all pre-operation images, post-operation images and relevant image thereof are three dimensional images, with each three dimensional image being individually sliced in coronal, sagittal and horizontal directions to form coronal, sagittal and horizontal cross-section respectively. In order to facilitate convenient description of each process flow of the present invention, one of the cross-section images is mostly taken as the representative for illustrating the present invention; furthermore, all images in the embodiments of the present invention are exemplarily illustrated in accordance with the single-sided craniotomy, but the present invention is by no means limited thereto, the present invention can be also applied to the dual-sided cranium reconstruction operation. For example, in FIG. 25, the left side shows the three dimensional model of mold points 8 of the incised part on both sides of the cranium, and the right side illustrates a simulated image of implanting the artificial implant reconstructed according to the three dimensional model of mold points 8. Certainly, other types of artificial implants can be also manufactured, such as artificial nasal cartilage, artificial breast for chest, and the like.

The aforementioned descriptions are illustrative, rather than being limiting. All effectively equivalent modifications or alternations made thereto without departing from the spirit and scope of the present invention are deemed to be included in the claims set forth hereunder.

What is claimed is:

1. A method for manufacturing an artificial implant, comprising the following steps:

acquiring a pre-operation three dimensional volume image, the pre-operation three dimensional volume image defining an original appearance of a target at an operation portion before incision;

acquiring a post-operation three dimensional volume image, the post-operation three dimensional volume image defining a post-operation appearance of the target at the operation portion after incision, the post-operation appearance having at least one incised part on the target comparing with the original appearance of the target;

acquiring a pre-operation target image from the pre-operation three dimensional volume image, the pre-operation target image defining a three dimensional volume image of the target before incision;

acquiring a post-operation target image from the post-operation three dimensional volume image, the post-operation target image defining a three dimensional volume image of the target after incision;

aligning the pre-operation target image with the post-operation target image and generating an aligned image;

retrieving a difference image from the aligned image corresponding to the incised part of the target, which is the difference in the pre-operation target image and the post-operation target image;

building a three dimensional model of mold points of the incised part based on the difference image; and manufacturing an artificial implant having substantially the same profile as the incised part based on the three dimensional model of mold points.

2. The method according to claim 1, wherein the step of acquiring the pre-operation target image from the pre-operation three dimensional volume image comprises the following steps:

adjusting brightness and contrast of the pre-operation three dimensional volume image, thereby making the target distinguishably shown in the pre-operation three dimensional volume image;

resampling the pre-operation three dimensional volume image, thereby modifying the resolution of the pre-operation three dimensional volume image such that the resolution thereof is identical to the post-operation three dimensional volume image, thus forming a pre-operation resample image;

applying a thresholding method on the pre-operation resample image to distinguish the target from background, and transforming the pre-operation resample image into a pre-operation binarized image by means of a binarization method, in which the value 1 in the pre-operation binarized image indicates the target, while 0 is deemed as the background; and removing a artifact image in the pre-operation binarized image generated due to a partial volume effect by means of an active profiling method, thereby obtaining the pre-operation target image.

3. The method according to claim 2, wherein before applying the active profiling method in order to remove the artifact image in the pre-operation binarized image, a closed profile is first formed from a profile of a portion of the target in the pre-operation binarized image by means of a mirroring method, and then the active contour method is applied on an inner edge and an outer edge of the closed profile, thereby generating the pre-operation target image.

4. The method according to claim 3, wherein when applying the active contour method on the inner edge of the target in the pre-operation binarized image, image dilation of two pixels is applied on the pre-operation binarized image.

5. The method according to claim 3, wherein when applying the active contour method on the outer edge of the target in the pre-operation binarized image, image erosion of two pixels is applied on the pre-operation binarized image.

6. The method according to claim 2, wherein parameters being set in the active contour method include a number of iterations, a step interval, an elasticity and a rigidity.

7. The method according to claim 6, wherein the number of iterations is 200 times.

8. The method according to claim 6, wherein the step interval is 0.1.

9. The method according to claim 6, wherein the elasticity is the square of the spatial discrete level.

10. The method according to claim 6, wherein the rigidity is the spatial discrete level to the power of four.

11. The method according to claim 1, wherein the step of generating the post-operation target image from the post-operation three dimensional volume image comprises the following steps:

adjusting brightness and contrast of the post-operation three dimensional volume image, thereby making the target distinguishably shown in the post-operation three dimensional volume image; and applying a thresholding method on the post-operation three dimensional volume image in order to distinguish the target from background, and transforming the post-operation three dimensional volume image into a post-operation binarized image by means of a binarization method, in which the value 1 in the post-operation binarized image indicates the target, while 0 is deemed as the background, and then using the post-operation binarized image as the post-operation target image.

12. The method according to claim 1, wherein the step of generating the aligned image from the post-operation target image and the pre-operation target image comprises the following steps:

overlapping the post-operation target image onto the pre-operation target image based on initial transform parameters of an image transform model;

using a cost function to examine that whether the pre-operation target image and the post-operation target image are aligned, then thereby generating the aligned image.

13. The method according to claim 12, wherein when the pre-operation target image and the post-operation target image are examined not aligned, the following steps are performed:

using the cost function to first calculate the difference value between the target in the post-operation target image and the target in the pre-operation target image;

squaring and then summing such difference values into a sum of squared difference (SSD);

using, if the SSD is greater than a preset value, an optimal iteration method to generate updated transform parameters; and overlapping the post-operation target image onto the pre-operation target image with the updated transform parameters of the image transform model, thereby generating the aligned image.

14. The method according to claim 12, wherein the image transform model is an affine transform model, and the transform parameters of the affine transform model include translation, rotation, scaling and skewing.

15. The method according to claim 13, wherein the optimal iteration method applies the Powell method to sequentially select the appropriate converging direction per iteration, so as to gradually reduce the SSD generated from the evaluation of the cost function, thereby allowing the SSD to be smaller than the preset value.

16. The method according to claim 13, wherein, when using the cost function to calculate the SSD, the post-operation target image transformed by means of the image transform model is first examined, and if the post-operation target image falls outside the whole volume of the pre-operation target image, then a punishment value is added when calculating the cost function.

17. The method according to claim 1, wherein, the step of generating the difference image from the aligned image comprises the following steps:

calculating the difference between the target before incision and the target after incision in the aligned image, thereby generating a preliminary image;

performing image erosion and dilation on the preliminary image so as to remove small residuals in the preliminary image and generate a secondary image;

removing unlinked portions not belonging to the incised part in the secondary image by using a three dimensional region growing method in order to generate a tertiary image; and removing the unlinked portions not belong to the incised part in the tertiary image by means of a manual erasure method, thereby generating the difference image.

18. The method according to claim 17, wherein, when performing image erosion and dilation on each preliminary image, the image erosion and dilation is applied on the upper half of the preliminary image by using a first structure element matrix, and on the lower half of the preliminary image by using a second structure element matrix.

19. The method according to claim 18, wherein the first structure element matrix is a 5×5 matrix defined as:

$$\begin{bmatrix} 0 & 0 & 1 & 0 & 0 \\ 0 & 1 & 1 & 1 & 0 \\ 1 & 1 & 1 & 1 & 1 \\ 0 & 1 & 1 & 1 & 0 \\ 0 & 0 & 1 & 0 & 0 \end{bmatrix}.$$

20. The method according to claim 18, wherein the second structure element matrix is a 3×3 matrix defined as:

$$\begin{bmatrix} 0 & 1 & 0 \\ 1 & 1 & 1 \\ 0 & 1 & 0 \end{bmatrix}.$$

21. The method according to claim 1, wherein the initial three dimensional model of mold points corresponding to the incised part is built from the difference image by applying a marching cube method.

22. The method according to claim 21, wherein the initial three dimensional model of mold points is smoothed by means of a surface Laplacian method.

* * * * *